(12) United States Patent
Geng et al.

(10) Patent No.: US 8,842,830 B2
(45) Date of Patent: Sep. 23, 2014

(54) METHOD AND APPARATUS FOR SENDING A KEY ON A WIRELESS LOCAL AREA NETWORK

(75) Inventors: Libo Geng, Beijing (CN); Junli Hu, Beijing (CN); Peng Zhang, Beijing (CN); Chenggui Cai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 354 days.

(21) Appl. No.: 13/236,445

(22) Filed: Sep. 19, 2011

(65) Prior Publication Data

US 2012/0110324 A1 May 3, 2012

(30) Foreign Application Priority Data

Sep. 19, 2010 (CN) .......................... 2010 1 0286269

(51) Int. Cl.
*H04K 1/00* (2006.01)
*H04L 29/06* (2006.01)
*H04W 12/04* (2009.01)
*H04W 84/12* (2009.01)

(52) U.S. Cl.
CPC ............. *H04L 63/061* (2013.01); *H04W 84/12* (2013.01); *H04W 12/04* (2013.01)
USPC .............................................. 380/270; 726/2

(58) Field of Classification Search
USPC .............................................. 380/270; 726/2
See application file for complete search history.

(56) References Cited

U.S. PATENT DOCUMENTS

| 7,317,708 B2 | 1/2008 | Moon et al. | |
|---|---|---|---|
| 2005/0237967 A1* | 10/2005 | Lee et al. | 370/328 |
| 2007/0206537 A1 | 9/2007 | Cam-Winget et al. | |
| 2009/0054037 A1* | 2/2009 | Kaippallimalil | 455/411 |

FOREIGN PATENT DOCUMENTS

| CN | 1859085 A | 11/2006 |
|---|---|---|
| CN | 101578828 A | 11/2009 |
| CN | 101621802 A | 1/2010 |
| CN | 101646170 A | 2/2010 |
| CN | 101651682 A | 2/2010 |
| WO | WO 2008/034357 A1 | 3/2008 |

OTHER PUBLICATIONS

"Secure Handover in Enterprise WLANs: CAPWAP JOKEY and IEEE 802.11 r" Clancy, Oct. 2008.*
P. Calhoun, et al., "Control and Provisioning of Wireless Access Points (CAPWAP) Protocol Specification", Network Working Group, Mar. 2009, 138 pages.

(Continued)

*Primary Examiner* — Christopher Brown

(57) ABSTRACT

A method and an apparatus for sending a key on a Wireless Local Area Network (WLAN) is provided. In a scenario where an Access Server is separate from an Access Controller, the Access Controller may send a master key of a specified WLAN station to the AC and trigger the AC to agree with the station on a transient key. The method includes: when receiving the master key of the WLAN station sent from an AAA server, searching a station information table for an IP address of an AC associated with the station; sending a message to the AC to instruct the AC to perform a 4-way handshake with the station to agree on a transient key, where the third message carries the master key of the station, a 4-way handshake triggering bit, and a MAC address of the WLAN station.

10 Claims, 7 Drawing Sheets

(56) References Cited

OTHER PUBLICATIONS

European Search Report dated Jan. 17, 2012 in connection with European Patent Application No. EP 11 00 7617.

T. Charles Clancy, et al., "Secure Handover in Enterprise WLANs: CAPWAP, HOKEY, and IEEE 802.11R", IEEE Wireless Communications, Oct. 2008, p. 80-85.

International Search Report dated Aug. 18, 2011 in connection with International Patent Application No. PCT/CN2011/074199.

* cited by examiner

METHOD AND APPARATUS FOR SENDING A KEY ON A WIRELESS LOCAL AREA NETWORK

CROSS-REFERENCE TO RELATED APPLICATION

This application claims priority to Chinese Patent Application No. 201010286269.2, filed on Sep. 19, 2010, and International Patent Application No. PCT/CN2011/074199, filed on May 17, 2011, both of which are hereby incorporated by reference in their entireties.

FIELD OF THE INVENTION

The present invention relates to the field of communications technologies, and in particular, to a method and an apparatus for sending a key on a wireless local area network.

BACKGROUND OF THE INVENTION

The Wireless Local Area Network (WLAN) is a computer local area network using a wireless channel as a transmission medium and is an important supplement and extension of wired networking. A network structure based on a WLAN technology generally includes network devices such as a WLAN station, an Access Point (AP), and an Access Controller (AC). The AP connects the WLAN station to an existing wired network, while the AC can manage the AP by using a Control and Provisioning of Wireless Access Point (CAPWAP) control channel.

Currently, the AC used in the WLAN may be classified into two types according to different functions implemented. The first type is an AC that is separate from a Broadband Remote Access Server (BRAS). In this case, the BRAS implements access authentication for the WLAN station and the AC manages the AP. The second type is an AC integrated with the BRAS. In this case, the AC is integrated with the BRAS as a functional module, and the BRAS implements access authentication for the WLAN station and manages the AP.

The following describes a process of implementing access authentication for the WLAN station in a scenario where the AC is integrated with the BRAS.

The AP establishes a CAPWAP link (including a CAPWAP data channel and a CAPWAP control channel) with the BRAS. The WLAN station sends an association request information to the AP; after receiving the association request information from the WLAN station, the AP sends a request to the BRAS to determine whether the WLAN station is permitted to associate with the AP. If the BRAS determines that the WLAN station is permitted to associate with the AP, the BRAS sends a result to the AP; the AP sends an association response frame to the WLAN station, permitting the WLAN station to associate with the AP. In this case, although the WLAN station is already successfully associated with the AP, the WLAN station is only permitted to use a wireless link between the WLAN station and the AP. The WLAN station also needs to initiate an authentication request to the BRAS, and the BRAS forwards the authentication request to an Authentication, Authorization and Accounting (AAA) server. After being authorized by the AAA server, the BRAS sends an authentication response to the WLAN station to notify the WLAN station of the fact that the WLAN station is authenticated successfully and permitted to access the Internet.

In the prior art, the WLAN station may use three access authentication methods, one of which is an Extensible Authentication Protocol Method for Mobile Communications Subscriber Identity Modules (EAP-SIM)/Extensible Authentication Protocol Method for 3rd Generation Authentication and Key Agreement (EAP-AKA). In an EAP-SIM/SAP-AKA authentication scenario, data transmitted on the wireless link between the WLAN station and the AP is encrypted by using a Wi-Fi Protected Access (WPA2) standard. After the WLAN station is authenticated, the AAA server sends a master key PMK of the WLAN station to the BRAS.

After the ERAS obtains the master key PMK of the WLAN station, if the BRAS integrates the AC, that is, if the AC is integrated with the BRAS as a functional module, the BRAS may notify the AC module by using an internal communication mechanism, and directly initiate a 4-way handshake with the WLAN station by using the master key PMK to agree on a transient key PTK. Subsequently, the data transmitted on the wireless link between the WLAN station and the AP is encrypted by using the transient key PTK.

However, the inventor discovers the following problems in the prior art: In a scenario where the BRAS is separate from the AC, after the BRAS obtains the master key PMK of the WLAN station from the AAA server, the ERAS fails to notify the AC of the master key PMK of the WLAN station by using an internal communication mechanism because the BRAS and the AC are not a same device. Consequently, the AC does not know when to perform the 4-way handshake with the WLAN station to agree on the transient key PTK.

SUMMARY OF THE INVENTION

Embodiments of the present invention provide a method and an apparatus for sending a key on a WLAN. In a scenario where a BRAS is separate from an AC, the BRAS may send a master key of a specified WLAN station to the AC and trigger the AC to agree with the WLAN station on a transient key.

To achieve the foregoing objective, the embodiments of the invention provide the following technical solutions:

A method for sending a key on a WLAN includes:

receiving a first CAPWAP message sent by an AC, where the first CAPWAP message carries an Internet Protocol (IP) address of an AP, an IP address of the AC, and a media access control (MAC) address of a WLAN station;

obtaining the IP address of the AP, the IP address of the AC, and the MAC address of the WLAN station from the first CAPWAP message, and storing the IP address of the AP, the IP address of the AC, and the MAC address of the WLAN station in a station information table;

sending a second CAPWAP message to the AC to trigger the AC to send association success information to the WLAN station, where the second CAPWAP message carries the MAC address of the WLAN station;

receiving an authentication request message of the WLAN station forwarded from the AC, and initiating authentication to an AAA server;

when receiving a master key of the WLAN station sent from the AAA server, searching the station information table for an IP address of an AC associated with the WLAN station; and sending a third CAPWAP message to the AC to instruct the AC to perform a 4-way handshake with the WLAN station to agree on a transient key, where the third CAPWAP message carries the master key of the WLAN station, a 4-way handshake triggering bit, and the MAC address of the WLAN station.

An apparatus for sending a key on a WLAN includes:

a first receiving unit 11, configured to receive a first CAPWAP message sent by an AC, where the first CAPWAP message carries an IP address of an AP, an IP address of the Ac, and a MAC address of a WLAN station;

a processing unit 12, configured to obtain the IP address of the AP, the IP address of the AC, and the MAC address of the WLAN station from the first CAPWAP message, and store the IP address of the AP, the IP address of the AC, and the MAC address of the WLAN station in a station information table;

a first sending unit 13, configured to send a second CAPWAP message to the AC to trigger the AC to send association success information to the WLAN station, where the second CAPWAP message carries the MAC address of the WLAN station;

a second receiving unit 14, configured to receive an authentication request message of the WLAN station forwarded from the AC, and initiate authentication to an AAA server;

a searching unit 15, configured to search the station information table for an IP address of an AC associated with the WLAN station when receiving a master key of the WLAN station sent from the AAA server; and a second sending unit 16, configured to send a third CAPWAP message to the AC to instruct the AC to perform a 4-way handshake with the WLAN station to agree on a transient key, where the third CAPWAP message carries the master key of the WLAN station, a 4-way handshake triggering bit, and the MAC address of the WLAN station.

The method and apparatus for sending a key on a WLAN in embodiments of the present invention may store, by employing the first CAPWAP message that is received from the AC, the IP address of the AP, the IP address of the AC, and the MAC address of the WLAN station in the station information table. After the WLAN station is associated with the AP successfully and authenticated by the AAA server, the master key of the WLAN station sent from the AAA server is received; the IP address of the AC associated with the WLAN station is found in the station information table; and the third CAPWAP message that carries the master key of the WLAN station, the 4-way handshake triggering bit, and the MAC address of the WLAN station is sent to the AC to instruct the AC to perform the 4-way handshake with the WLAN station to agree on the transient key.

According to embodiments of the present invention, in a scenario where the BRAS is separate from the AC, the BRAS may send the master key of the WLAN station to the AC to trigger the AC to agree with the WLAN station on the transient key. In this way, it is ensured that a station in a WLAN network can still encrypt the data transmitted on the wireless link between the station and the AP by using the WAP2 standard after the authentication succeeds, which fully ensures security and reliability of the WLAN.

BRIEF DESCRIPTION OF THE DRAWINGS

To illustrate the technical solutions of the present invention more clearly, the accompanying drawings for describing the embodiments of the present invention are described briefly below. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention are described in detail with reference to the embodiments and the accompanying drawings. Apparently, the embodiments described are only exemplary and not exhaustive. Persons having ordinary skill in the art can derive other embodiments from the embodiments given herein without making any creative effort, and all such embodiments are covered in the protection scope of the present invention.

Figure 1:
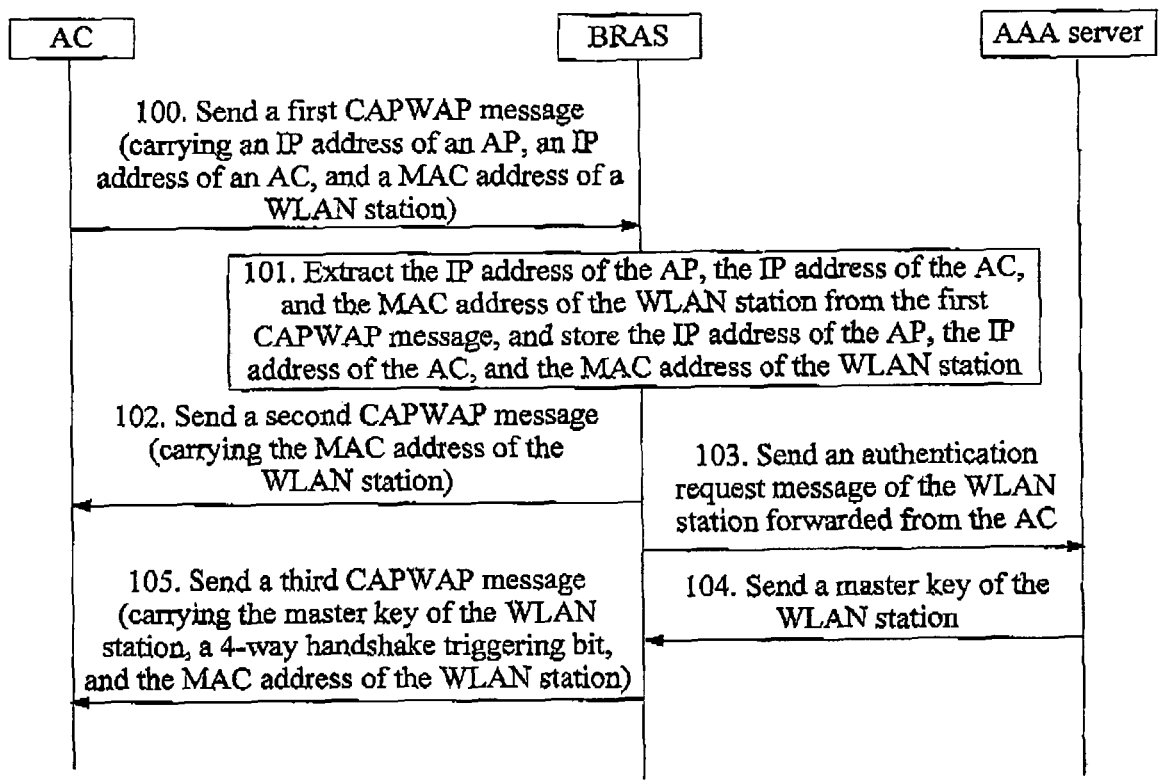
FIG. 1 is a flowchart of a method for sending a key on a WLAN according to an embodiment of the present invention.

FIG. 1 illustrates a method for sending a key on a WLAN according to an embodiment of the present invention. In this embodiment, a BRAS is separate from an AC; the BRAS implements access authentication for a WLAN station and the AC manages an AP. The following describes the method applied on the BRAS. The method includes the following steps:

100. The BRAS receives a first CAPWAP message sent by the AC, where the first CAPWAP message carries an IP address of the AP, an IP address of the AC, and a MAC address of the WLAN station.

101. The BRAS extracts the IP address of the AP, the IP address of the AC, and the MAC address of the WLAN station from the first CAPWAP message, and stores the extracted information in a station information table as WAN station information.

Specifically, when requesting association with the AP, the WLAN station sends an association request information to the AC; after receiving the association request information, the AC extracts the IP address of the AP, the IP address of the AC, and the MAC address of the WLAN station from the association request information, and sends the extracted information to the BRAS through the first CAPWAP message. The BRAS stores the IP address of the AP, the IP address of the AC, and the MAC address of the WLAN station in the station information table. The station information table is used to search for an AP and an AC that are associated with a station. For example, to notify a message of processing a station to the AC, the BRAS may search the station information table for the IP address of the AC associated with the station.

For example, the first CAPWAP message may be a new message obtained by extending a CAPWAP protocol packet. The first CAPWAP message carries the IP address of the AP, the IP address of the AC, and the MAC address of the WLAN station.

In addition, the WLAN station and the AP transmit data by using an 802.11 frame. The AP converts the 802.11 frame of the WLAN station into a frame format that can be identified by the AC, and then sends the converted data frame to the AC through a CAPWAP data channel. For example, the AP converts the 802.11 frame of the WLAN station into an 802.3 frame, and then sends the 802.3 frame to the AC.

102. The BRAS sends a second CAPWAP message that carries the MAC address of the WLAN station to the AC to trigger the AC to send association success information to the WLAN station.

Specifically, after receiving the first CAPWAP message sent by the AC, and extracting the IP address of the AP, the IP address of the AC, and the MAC address of the WLAN station carried the first CAPWAP message, the BRAS sends a second CAPWAP message that carries the MAC address of the WLAN station to the AC; after receiving the second CAPWAP message, the AC sends association success information to the WLAN station to notify the WLAN station of the fact that the WLAN station is permitted to associate with the AP. The WLAN station is successfully associated with the AP.

For example, the second CAPWAP message is a new message obtained by extending the CAPWAP protocol packet, and carries the MAC address of the WLAN station.

In addition, if the AC fails to receive the second CAPWAP message within a preset time, for example, if the AC fails to receive the second CAPWAP message within 10 minutes after sending the first CAPWAP message, the AC re-sends the first CAPWAP message in step 101 to the BRAS. If the AC still fails to receive the second CAPWAP message sent from the BRAS after the number of times of re-sending reaches a specified threshold, for example, if the AC still fails to receive the second CAPWAP message sent from the BRAS after the AC re-sends the first CAPWAP message three times, the AC returns association failure information to the WLAN station.

103. The BRAS receives an authentication request message of the WLAN station forwarded from the AC, and initiates authentication to an AAA server.

Specifically, after the WLAN station is successfully associated with the AP in step 102, the WLAN station initiates an authentication request. In this case, the BRAS receives the authentication request message of the WLAN station forwarded from the AC, and initiates authentication to the AAA server.

104. The BRAS receives a master key of the WLAN station sent from the AAA server.

After confirming that the WLAN station is authenticated, the AAA server notifies the BRAS over a Remote Authentication Dial-In User Service (RADIUS) protocol, and sends the master key PMK of the WLAN station to the BRAS. A possible scenario is as follows: the WLAN station initiates EAP-SIM/EAP-AKA authentication to the BRAS; after an EAP-SIM/EAP-AKA protocol interaction process, the AAA server permits the WLAN station to be authenticated, and sends the master key PMK to the BRAS over the RADIUS protocol.

105. The BRAS searches the station information table for an IP address of an AC associated with the WLAN station, and sends a third CAPWAP message to the AC to instruct the AC to perform a 4-way handshake with the WLAN station to agree on a transient key, where the third CAPWAP message carries the master key of the WLAN station, a 4-way handshake triggering bit, and the MAC address of the WLAN station.

specifically, the BRAS searches the station information table for the IP address of the AC associated with the WLAN station, and notifies the master key PMK of the WLAN station and the 4-way handshake triggering bit to the AC associated with the WLAN station. For example, the third CAPWAP message is a new message obtained by extending the CAPWAP protocol packet, and carries the master key of the WLAN station, the 4-way handshake triggering bit, and the MAC address of the WLAN station.

According to the implementation process of the method for sending a key on a WLAN in this embodiment, the BRAS may store, by employing the first CAPWAP message that is received from the AC, the IP address of the AP, the IP address of the AC, and the MAC address of the WLAN station in the station information table. After the WLAN station is associated with the AP successfully and authenticated by the AAA server, the BRAS receives the master key of the WLAN station sent from the AAA server, searches the station information table for the IP address of the AC associated with the WLAN station, and sends the third CAPWAP message that carries the master key of the WLAN station, the 4-way handshake triggering bit, and the MAC address of the WLAN station to the AC to instruct the AC to perform the 4-way handshake with the WLAN station to agree on the transient key.

In this embodiment, in a scenario where the BRAS is separate from the AC, the BRAS may send the master key of the WLAN station to the AC to trigger the AC to agree with the WLAN station on the transient key. In this way, it is ensured that the WLAN station can encrypt the data transmitted on the wireless link between the WLAN station and the AP by using a WAP2 standard after the authentication succeeds, which fully ensures security and reliability of the WLAN.

In a specific application process, preferably, the first CAPWAP message, the second CAPWAP message, or the third CAPWAP message may further carry a virtual LAN identity (VLAN ID) of the WLAN station. In this case, the VLAN ID of the WLAN station carried in the first CAPWAP message may also be stored in the station information table in step 101.

Figure 2:
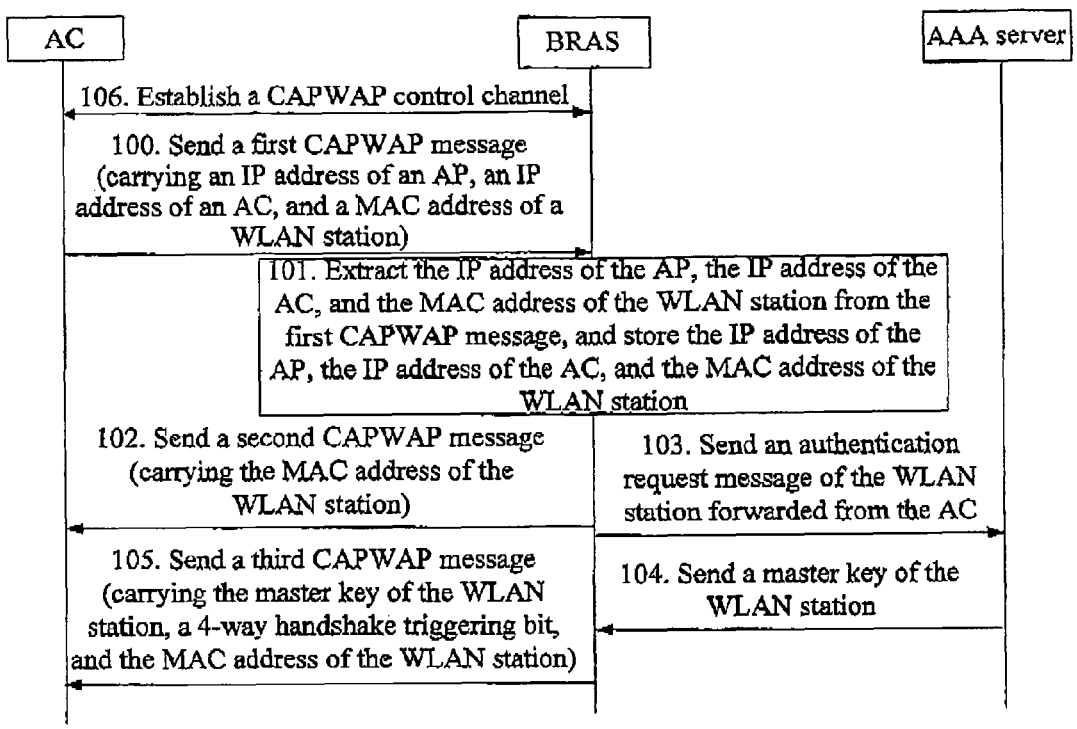
FIG. 2 is a flowchart of another method for sending a key on a WLAN according to an embodiment of the present invention.

Optionally, at the initial setup of the WLAN, an AC helper may be configured on the AC, and the AC helper may be a BRAS. The BRAS runs a CAPWAP protocol. The AC actively requests the BRAS to establish a CAPWAP link according to an IP address, which is configured locally, of the BRAS. In this case, as shown in FIG. 2, before the BRAS receives the first CAPWAP message sent by the AC, the method further includes the following step:

106. The BRAS receives a CAPWAP link request sent by the AC, and establishes a CAPWAP control channel with the AC.

Because the BRAS acts as the AC helper only for the AC rather than the AP, the CAPWAP protocol run on the BRAS does not have the function of controlling and managing the AP. Therefore, only a CAPWAP control channel with a Datagram Transport Layer Security (DTLS) encryption function and a keep-alive mechanism needs to be established, and the CAPWAP data channel is not needed.

Figure 3:
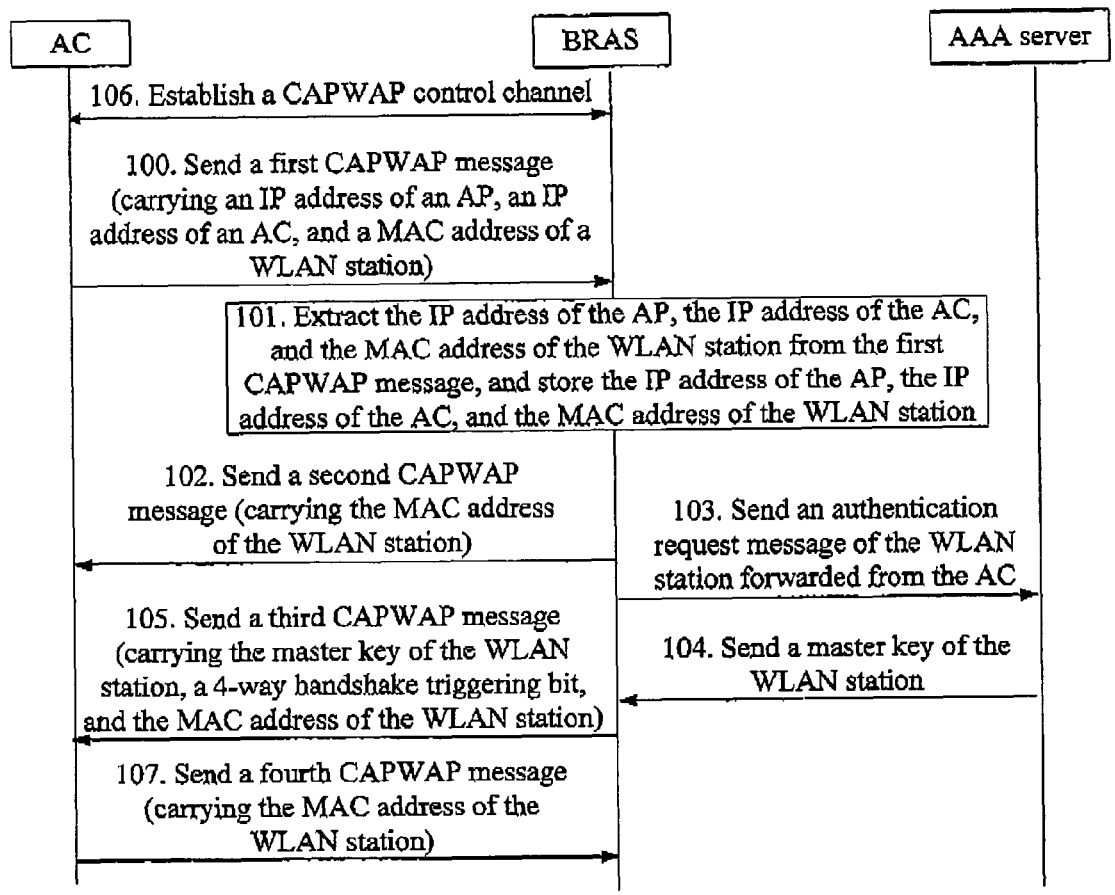
FIG. 3 is a flowchart of another method for sending a key on a WLAN according to an embodiment of the present invention.

Optionally, as shown in FIG. 3, after the BRAS sends the third CAPWAP message to the AC, the method further includes the following steps:

107. The BRAS receives a fourth CAPWAP message sent by the AC to confirm that the AC already receives the third CAPWAP message, where the fourth CAPWAP message carries the MAC address of the WLAN station.

For example, the fourth CAPWAP message is a new message obtained by extending the CAPWAP protocol packet, and carries the MAC address of the WLAN station. If the BRAS fails to receive the fourth CAPWAP message within a specified time, for example, if the BRAS fails to receive the fourth CAPWAP message within 10 minutes after sending the third CAPWAP message, the BRAS re-sends the third CAPWAP message to the AC. If the BRAS still fails to receive the fourth CAPWAP message when the number of times of re-sending reaches a preset threshold, for example, when the BRAS re-sends the third CAPWAP message to the AC three times, the BRAS deletes the WLAN station information from the station information table, and checks whether the CAPWAP control channel between the BRAS and the AC is connected, for example, the BRAS may check whether the CAPWAP control channel is connected or disconnected according to a keep-alive message. When confirming that the CAPWAP control channel is connected, the BRAS sends a seventh CAPWAP message to the AC to notify the AC of the fact that the WLAN station information is already deleted. For example, the seventh CAPWAP message is a new message obtained by extending the CAPWAP protocol packet, and carries the MAC address of the WLAN station. After receiving the seventh CAPWAP message, the AC obtains an IP address of an AP associated with the WLAN station from the station information table that is locally stored according to the MAC address of the WLAN station, instructs the AP to dissociate from the WLAN station, and deletes the WLAN station from the station information table that is locally stored.

Optionally, the AC may detect current status of the CAPWAP control channel. In an actual application process, if the BRAS confirms that the CAPWAP control channel is disconnected, the BRAS cannot send the seventh CAPWAP message to the AC. After confirming that the CAPWAP control channel is disconnected, the AC obtains every WLAN station corresponding to the BRAS and the IP address of the AP associated with the WLAN station from the station information table that is locally stored, instructs the AP of every WLAN station to dissociate from the WLAN station, and deletes the every WLAN station from the station information table that is locally stored.

After receiving the third CAPWAP message, the AC may obtain the master key of the WLAN station from the third CAPWAP message, and perform a 4-way handshake with the WLAN station to agree on and obtain a transient key PTK of the WLAN station. Then, the AC notifies the AP of the transient key PTK. The WLAN station and the AP encrypt and decrypt wireless data by using the transient key PTK.

Figure 4:
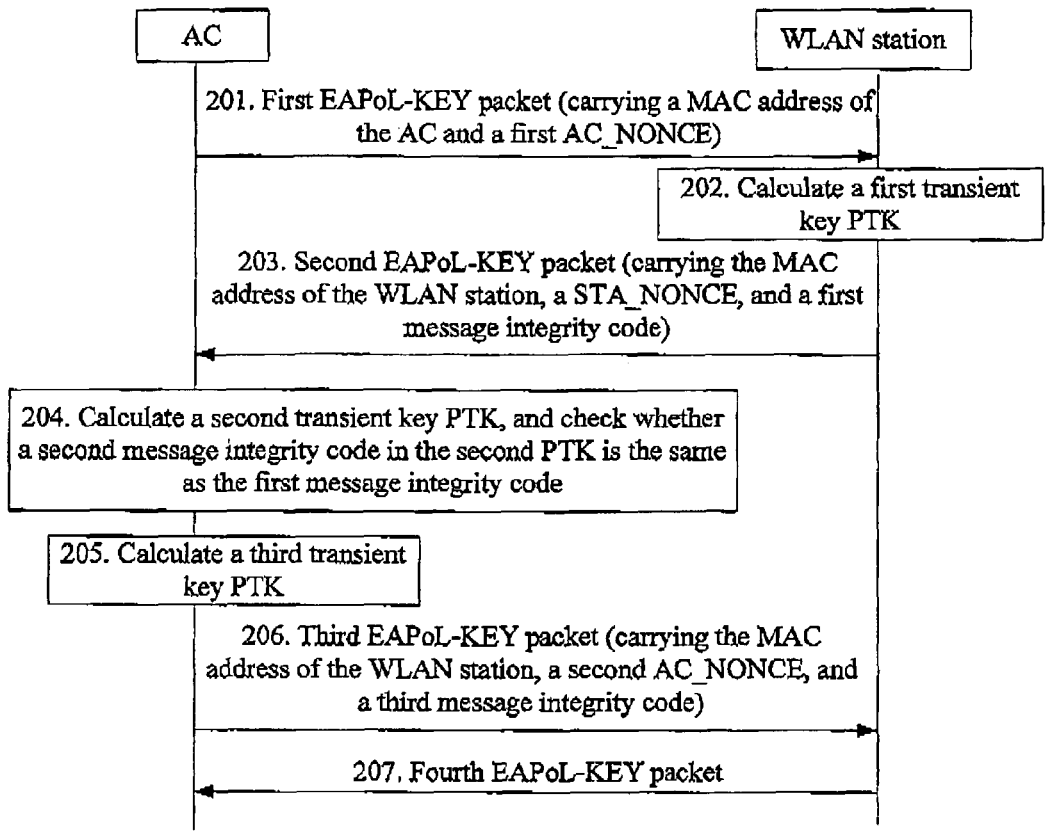
FIG. 4 is a flowchart of a method for agreeing on a transient key by using a master key according to an embodiment of the present invention.

To describe the method for sending a key on a WLAN in this embodiment in detail, the following describes a process where the AC obtains the master key of the WLAN station and triggers a 4-way handshake with the WLAN station to agree on a transient key PTK after receiving the third CAPWAP message. As shown in FIG. 4, the process includes the following steps:

201. The AC sends a first KEY of Extensible Authentication Protocol over Local Area Network (EAPoL-KEY) packet to the WLAN station, where the first EAPoL-KEY packet carries a MAC address of the AC and a first Access Control NONCE (AC_NONCE).

202. After receiving the first EAPoL-KEY packet, the WLAN station calculates a first transient key PTK by using the MAC address of the AC, the MAC address of the WLAN station, a STATION NONCE (STA_NONCE), and the master key PMK that is locally stored.

For example, the length of the calculated first transient key PTK may be 64 bytes. Optionally, specific 16 bytes in the first transient key PTK may be used as a first message integrity code. Other specific 16 bytes are used as a wireless data encryption key of the WLAN station and the AP.

203. The WLAN station returns a second EAPoL-KEY packet to the AC, where the second EAPoL-KEY packet carries the MAC address of the WLAN station, the STA_NONCE, and the first message integrity code.

204. The AC receives the second EAPoL-KEY packet, and calculates a second transient key PTK by using the MAC address of the WLAN station and the STA_NONCE carried in the packet, the MAC address of the AC, the first AC_NONCE, and the master key PMK of the WLAN station that is obtained from the third CAPWAP message.

Similar to the first transient key PTK, the length of the second transient key PTK may also be 64 bytes. Optionally, the AC may also take out specific 16 bytes from the second transient key PTK and use the 16 bytes as a second message integrity code. The AC compares the second message integrity code with the first message integrity code; if both are the same, the AC confirms that the WLAN station knows the master key PMK.

205. The AC re-generates a second AC_NONCE, and calculates a third transient key PTK by using the MAC address of the AC, the newly generated second AC_NONCE, the MAC address of the WLAN station, the STA_NONCE, and the master key PMK of the WLAN station. Similarly, the length of the third transient key PTK may also be 64 bytes. Optionally, specific 16 bytes may be taken out from the third transient key PTK and used as a third message integrity code; other specific 16 bytes indicate a ready installation and using data encryption key.

206. The AC returns a third EAPoL-KEY packet to the WLAN station, where the third EAPoL-KEY packet carries the MAC address of the AC, the newly generated second AC_NONCE, the newly generated third message integrity code, and the ready installation and using data encryption key.

207. The WLAN station receives the third EAPoL-KEY packet, and checks the message integrity code of the packet. After confirming that the AC already knows the master key PMK, the WLAN station returns a fourth EAPoL-KEY packet to notify the AC of the fact that the WLAN station has verified the master key and the ready installation and using data encryption key. Then, the handshake process ends.

After the 4-way handshake succeeds, the AC sends the transient key to the AP by using a CAPWAP protocol packet that is encrypted with the DTLS for transmission.

Optionally, in an execution process of the method for sending a key on a WLAN in this embodiment, the following application cases may occur.

Case 1:

After storing the WLAN station information in the station information table in step 101, the BRAS may set a lifecycle for each piece of station information in the station information table; if the lifecycle of the WLAN station information expires, the BRAS extracts an IP address of an AC associated with the WLAN station from the station information table, and sends a fifth CAPWAP message to the AC through the CAPWAP control channel to notify the AC of the fact that the lifecycle of the WLAN station already expires. For example, the fifth CAPWAP message is a new message obtained by extending the CAPWAP protocol packet, and carries the MAC address of the WLAN station.

After the AC receives the fifth CAPWAP message, if determining that the WLAN station is still online, the AC re-sends the first CAPWAP message to the BRAS to notify the AC of the fact that the WLAN station is online. If the AC determines that the WLAN station is offline, the AC does not send any message, and the BRAS deletes the WLAN station information from the station information table.

Case 2:

After the WLAN station is dissociated from the AP, the AC actively sends a sixth CAPWAP message to the BRAS to notify the BRAS of the fact that the WLAN station is dissociated from the AP. For example, the sixth CAPWAP message is a new message obtained by extending the CAPWAP protocol packet, and carries the MAC address of the WLAN station. In this case, the BRAS in this embodiment deletes the WLAN station information from the station information table according to the sixth CAPWAP message, so that the WLAN station goes offline and cannot access the Internet.

Case 3:

After the WLAN station actively goes offline, the BRAS actively deletes the WLAN station information from the station information table, and sends a seventh CAPWAP message to an AC associated with the WLAN station to notify the AC of the fact that the WLAN station information is already deleted. For example, the seventh CAPWAP message is a new message obtained by extending the CAPWAP protocol packet, and carries the MAC address of the WLAN station. After receiving the seventh CAPWAP message, the AC obtains an IP address of an AP associated with the WLAN station from the station information table that is locally stored according to the MAC address of the WLAN station, instructs the AP to dissociate from the WLAN station, and deletes the WLAN station from the station information table that is locally stored.

Case 4:

If the AC and the WLAN station fail to agree on a transient key PTK through the 4-way handshake, the AC actively sends a sixth CAPWAP message to the BRAS to notify the BRAS of the fact that the AC and the WLAN station fail to agree on a transient key. In this case, the BRAS deletes the WLAN station information from the station information table according to the sixth CAPWAP message, so that the WLAN station goes offline and cannot access the Internet.

Preferably, the fourth CAPWAP message, the fifth CAPWAP message, the sixth CAPWAP message, or the seventh CAPWAP message may further carry a VLAN ID of the WLAN station.

Figure 5:
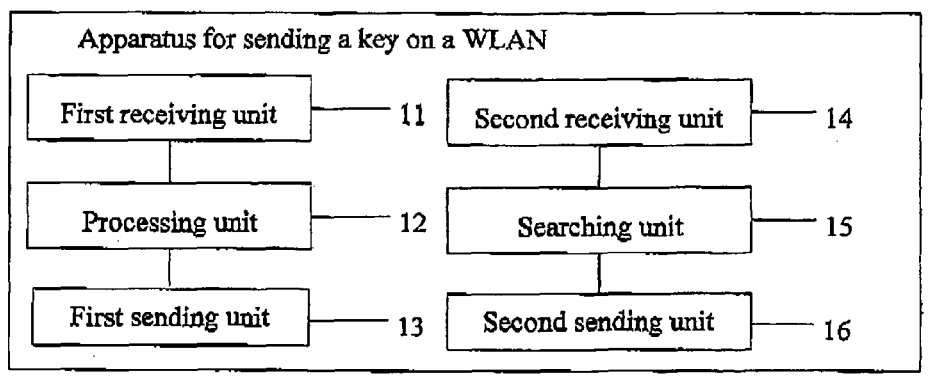
FIG. 5 is a block diagram of an apparatus for sending a key on a WLAN according to an embodiment of the present invention.

An embodiment of the present invention provides an apparatus for sending a key on a WLAN. As shown in FIG. 5, the apparatus includes:

a first receiving unit 11, configured to receive a first CAPWAP message sent by an AC, where the first CAPWAP message carries an IP address of an AP, an IP address of the AC, and a MAC address of a WLAN station;

a processing unit 12, configured to obtain the IP address of the AP, the IP address of the AC, and the MAC address of the WLAN station from the first CAPWAP message, and store the IP address of the AP, the IP address of the AC, and the MAC address of the WLAN station in a station information table;

a first sending unit 13, configured to send a second CAPWAP message to the AC to trigger the AC to send association success information to the WLAN station, where the second CAPWAP message carries the MAC address of the WLAN station;

a second receiving unit 14, configured to receive an authentication request message of the WLAN station forwarded from the AC, and initiate authentication to an AAA server;

a searching unit 15, configured to search the station information table for an IP address of an AC associated with the WLAN station when receiving a master key of the WLAN station sent from the AAA server; and a second sending unit 16, configured to send a third CAPWAP message to the AC to instruct the AC to perform a 4-way handshake with the WLAN station to agree on a transient key, where the third CAPWAP message carries the master key of the WLAN station, a 4-way handshake triggering bit, and the MAC address of the WLAN station.

Figure 6:
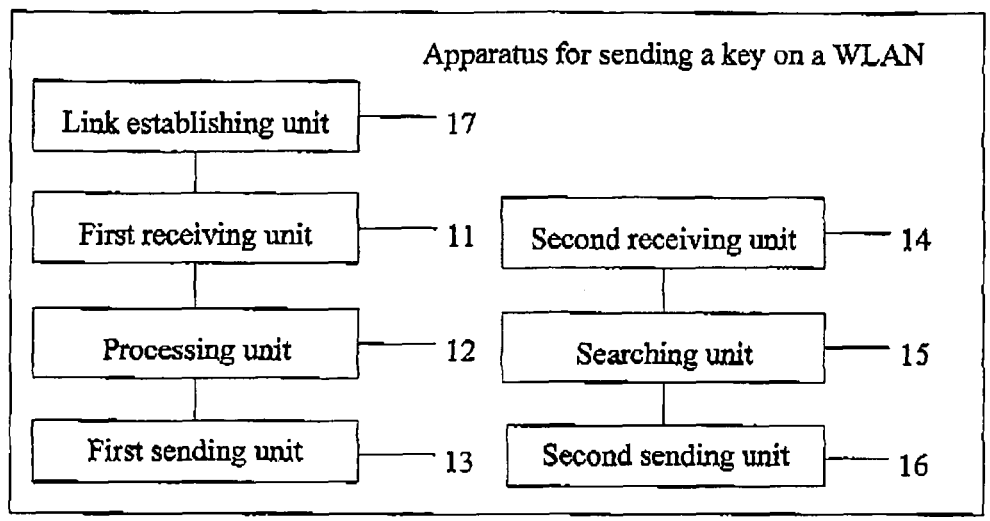
FIG. 6 is a block diagram of another apparatus for sending a key on a WLAN according to an embodiment of the present invention.

Optionally, as shown in FIG. 6, the apparatus may further include a link establishing unit 17 configured to receive a CAPWAP link request sent by the AC, and establish a CAPWAP control channel with the AC.

Figure 7:
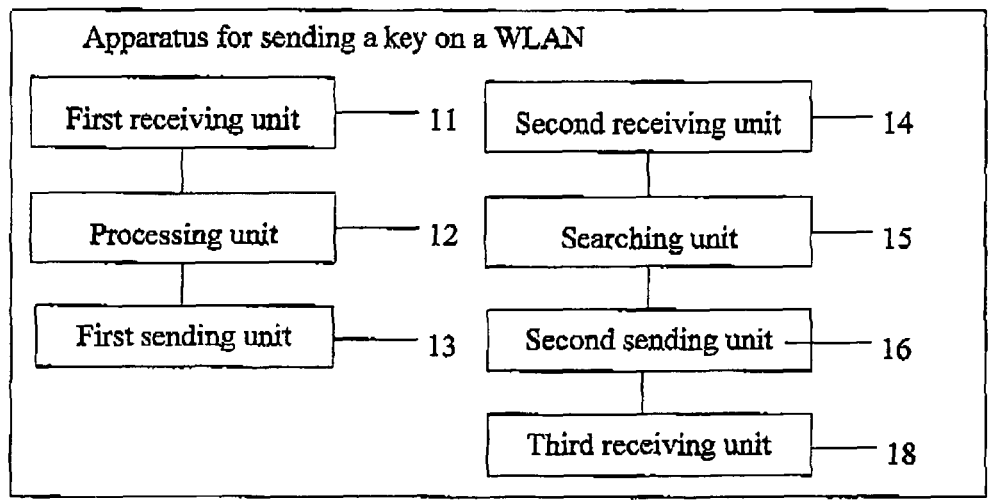
FIG. 7 is a block diagram of another apparatus for sending a key on a WLAN according to an embodiment of the present invention.

Optionally, as shown in FIG. 7, after the second sending unit 16 sends the third CAPWAP message to the AC, the apparatus may further include:

a third receiving unit 18, configured to receive a fourth CAPWAP message sent by the AC to confirm that the AC already receives the third CAPWAP message, where the fourth CAPWAP message carries the MAC address of the WLAN station.

Figure 8:
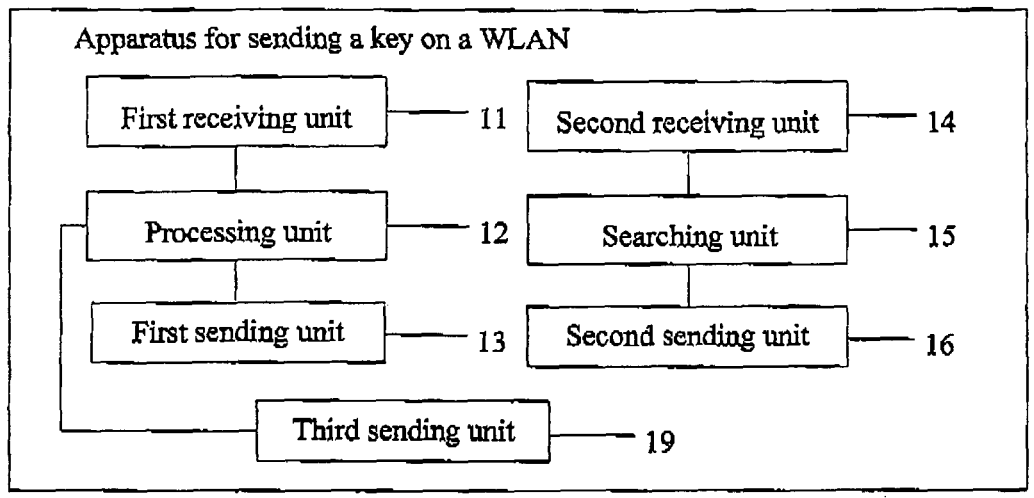
FIG. 8 is a block diagram of another apparatus for sending a key on a WLAN according to an embodiment of the present invention.

Optionally, a lifecycle may be set for each piece of station information stored in the station information table. As shown in FIG. 8, the apparatus further includes:

a third sending unit 19, configured to send a fifth CAPWAP message that carries the MAC address of the WLAN station to an AC associated with the WLAN station to notify the AC of the fact that the lifecycle of the WLAN station expires if the lifecycle of the WLAN station information expires.

Figure 9:
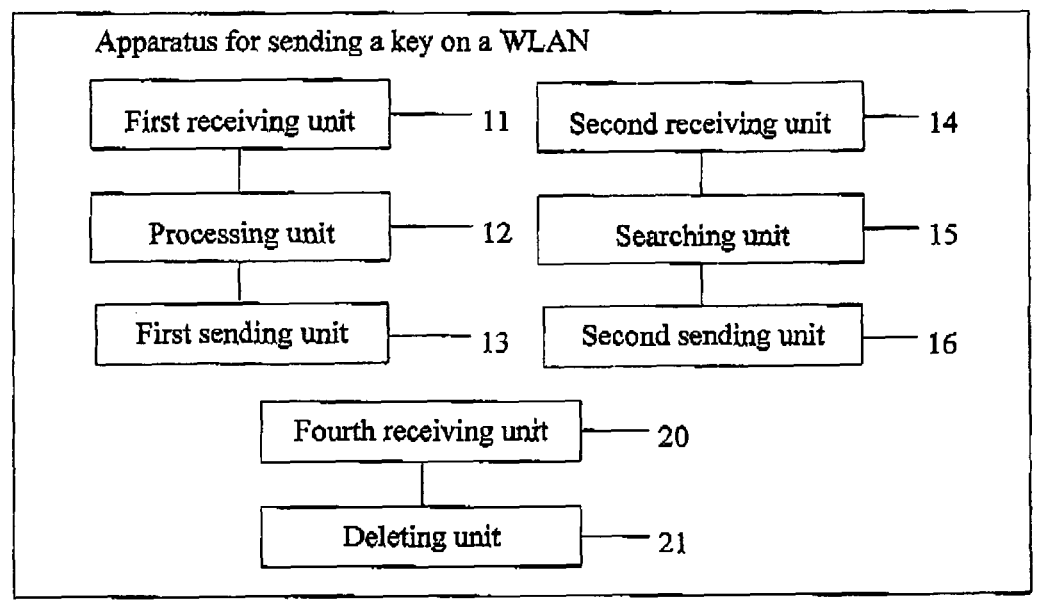
FIG. 9 is a block diagram of another apparatus for sending a key on a WLAN according to an embodiment of the present invention.

Optionally, as shown in FIG. 9, the apparatus may further include a fourth receiving unit 20 and a deleting unit 21.

After the WLAN station is dissociated from the AP or when the AC and the WLAN station fail to agree on a transient key PTK through the 4-way handshake, the fourth receiving unit 20 is configured to receive a sixth CAPWAP message sent by the AC, where the sixth CAPWAP message carries the MAC address of the WLAN station. The deleting unit 21 is configured to delete the WLAN station information from the station information table according to the sixth CAPWAP message.

Figure 10:
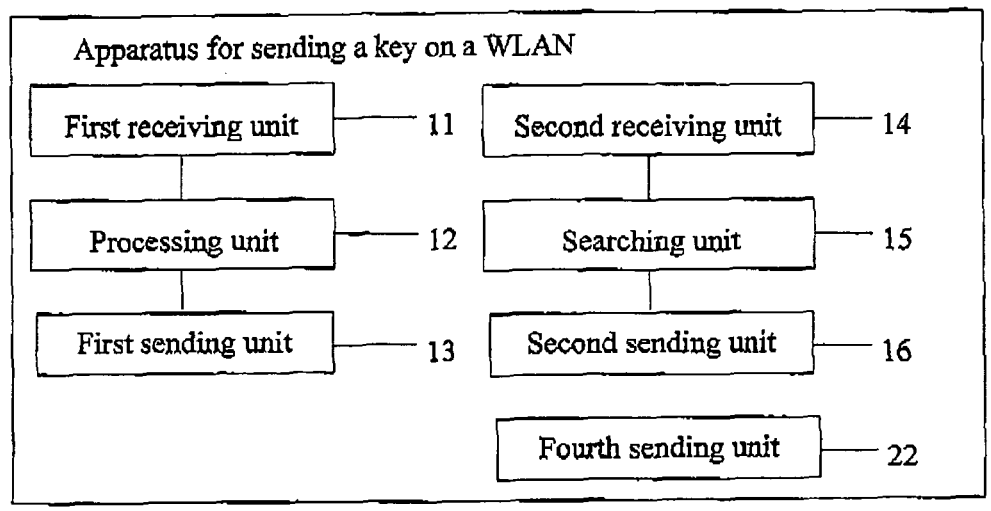
FIG. 10 is a block diagram of another apparatus for sending a key on a WLAN according to an embodiment of the present invention.

Further, if the WLAN station actively goes offline, the deleting unit 21 is triggered to delete the WLAN station information from the station information table. As shown in FIG. 10, the apparatus further includes a fourth sending unit 22.

The fourth sending unit 22 is configured to send a seventh CAPWAP message to an AC associated with the WLAN station to notify the AC of the fact that the WLAN station information is already deleted, where the seventh CAPWAP message carries the MAC address of the WLAN station.

Specifically, the apparatus for sending a key on a WLAN may be a BRAS, and the WLAN station may be a mobile terminal.

Optionally, the first CAPWAP message, the second CAPWAP message, the third CAPWAP message, the fourth CAPWAP message, the fifth CAPWAP message, the sixth CAPWAP message, or the seventh CAPWAP message may further carry a VLAN ID of the WLAN station. In this case, the obtaining unit 11 may also store the VLAN ID of the WLAN station carried in the first CAPWAP message.

In this embodiment, in a scenario where the BRAS is separate from the AC, the BRAS may send the master key of the WLAN station to the AC, and trigger the AC to agree with the WLAN station on a transient key. In this way, it is ensured that the WLAN station can encrypt data transmitted on the wireless link between the WLAN station and the AP by using a WAP2 standard after the authentication succeeds, which fully ensures security and reliability of the WLAN.

The preceding descriptions are merely exemplary embodiments of the present invention, but not intended to limit the protection scope of the present invention. Any modification or substitution readily conceivable to those skilled in the art within the scope of technical disclosures of the present invention shall fall within the protection scope of the present invention. Therefore, the protection scope of the present invention is subject to the appended claims.

What is claimed is:

1. A method for sending a key on a Wireless Local Area Network (WLAN) in which an Access Controller (AC) is separated from a broadband remote access server (BRAS), the method comprising:
   receiving, by the BRAS, a first Control and Provisioning of Wireless Access Point (CAPWAP) message sent by the AC, wherein the first CAPWAP message carries an Internet Protocol (IP) address of an Access Point (AP), an IP address of the AC, and a media access control (MAC) address of a WLAN station;
   obtaining, by the BRAS, the IP address of the AP, the IP address of the AC, and the MAC address of the WLAN station from the first CAPWAP message, and storing the IP address of the AP, the IP address of the AC, and the MAC address of the WLAN station in a station information table;
   sending, by the BRAS, a second CAPWAP message to the AC to trigger the AC to send association success information to the WLAN station, wherein the second CAPWAP message carries the MAC address of the WLAN station;
   receiving, by the BRAS, an authentication request message of the WLAN station forwarded from the AC, and initiating authentication to an Authentication, Authorization and Accounting (AAA) server;
   when receiving a master key of the WLAN station sent from the AAA server, searching, by the BRAS, the station information table for an IP address of an AC associated with the WLAN station; and
   sending, by the BRAS, a third CAPWAP message to the AC to instruct the AC to perform a 4-way handshake with the WLAN station to agree on a transient key, wherein the third CAPWAP message carries the master key of the WLAN station, a 4-way handshake triggering bit, and the MAC address of the WLAN station.

2. The method of claim 1, wherein before receiving the first CAPWAP message sent by the AC, the method further comprises: receiving, by the BRAS, a CAPWAP link request sent by the AC, and establishing a CAPWAP control channel with the AC.

3. The method of claim 1, wherein after sending the third CAPWAP message to the AC, the method further comprises: receiving, by the BRAS, a fourth CAPWAP message sent by the AC to confirm that the AC already receives the third CAPWAP message, wherein the fourth CAPWAP message carries the MAC address of the WLAN station.

4. The method of claim 1, wherein each piece of station information stored in the station information table corresponds to a lifecycle and after the obtaining the IP address of the AP, the IP address of the AC, and the MAC address of the WLAN station from the first CAPWAP message and storing the IP address of the AP, the IP address of the AC, and the MAC address of the WLAN station in the station information table, the method further comprises:
   if the lifecycle of the WLAN station information expires, sending, by the BRAS, a fifth CAPWAP message that carries the MAC address of the WLAN station to the AC associated with the WLAN station to notify the AC of the fact that the lifecycle of the WLAN station expires.

5. The method of claim 3, wherein each piece of station information stored in the station information table corresponds to a lifecycle and after the obtaining the IP address of the AP, the IP address of the AC, and the MAC address of the WLAN station from the first CAPWAP message and storing the IP address of the AP, the IP address of the AC, and the MAC address of the WLAN station in the station information table, the method further comprises:
   if the lifecycle of the WLAN station information expires, sending, by the BRAS, a fifth CAPWAP message that carries the MAC address of the WLAN station to the AC associated with the WLAN station to notify the AC of the fact that the lifecycle of the WLAN station expires.

6. The method of claim 1, wherein after the obtaining the IP address of the AP, the IP address of the AC, and the MAC address of the WLAN station from the first CAPWAP message and storing the IP address of the AP, the IP address of the AC, and the MAC address of the WLAN station in the station information table, the method further comprises:
   receiving, by the BRAS, a sixth CAPWAP message sent by the AC, wherein the sixth CAPWAP message carries the MAC address of the WLAN station; and
   deleting, by the BRAS, the WLAN station information from the station information table according to the sixth CAPWAP message.

7. The method of claim 2, wherein after the obtaining the IP address of the AP, the IP address of the AC, and the MAC address of the WLAN station from the first CAPWAP message and storing the IP address of the AP, the IP address of the AC, and the MAC address of the WLAN station in the station information table, the method further comprises:
   receiving, by the BRAS, a sixth CAPWAP message sent by the AC, wherein the sixth CAPWAP message carries the MAC address of the WLAN station; and
   deleting, by the BRAS, the WLAN station information from the station information table according to the sixth CAPWAP message.

8. The method of claim 3, wherein after the obtaining the IP address of the AP, the IP address of the AC, and the MAC address of the WLAN station from the first CAPWAP message and storing the IP address of the AP, the IP address of the AC, and the MAC address of the WLAN station in the station information table, the method further comprises:
   receiving, by the BRAS, a sixth CAPWAP message sent by the AC, wherein the sixth CAPWAP message carries the MAC address of the WLAN station; and
   deleting, by the BRAS, the WLAN station information from the station information table according to the sixth CAPWAP message.

9. The method of claim 1, wherein after the obtaining the IP address of the AP, the IP address of the AC, and the MAC address of the WLAN station from the first CAPWAP message and storing the IP address of the AP, the IP address of the AC, and the MAC address of the WLAN station in the station information table, the method further comprises:
   deleting, by the BRAS, the WLAN station information from the station information table; and
   sending, by the BRAS, a seventh CAPWAP message to the AC associated with the WLAN station to notify the AC of the fact that the WLAN station information is already deleted, wherein the seventh CAPWAP message carries the MAC address of the WLAN station.

10. The method of claim 3, wherein after the obtaining the IP address of the AP, the IP address of the AC, and the MAC address of the WLAN station from the first CAPWAP message and storing the IP address of the AP, the IP address of the AC, and the MAC address of the WLAN station in the station information table, the method further comprises:

deleting, by the BRAS, the WLAN station information from the station information table; and sending, by the BRAS, a seventh CAPWAP message to the AC associated with the WLAN station to notify the AC of the fact that the WLAN station information is already deleted, wherein the seventh CAPWAP message carries the MAC address of the WLAN station.

* * * * *